(12) United States Patent
Farrell et al.

(10) Patent No.: US 11,095,668 B2
(45) Date of Patent: Aug. 17, 2021

(54) TRANSACTION AUTHENTICATION AND RISK ANALYSIS

(71) Applicant: International Business Machines Corporation, Armonk, NY (US)

(72) Inventors: Leo Michael Farrell, Tamborine Mountain (AU); Shane Bradley Weeden, Paradise Point (AU)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 16/373,767

(22) Filed: Apr. 3, 2019

(65) Prior Publication Data

US 2020/0322358 A1    Oct. 8, 2020

(51) Int. Cl.
*H04L 29/06* (2006.01)
*H04W 12/122* (2021.01)

(52) U.S. Cl.
CPC .......... *H04L 63/1416* (2013.01); *H04L 63/10* (2013.01); *H04L 63/18* (2013.01); *H04W 12/122* (2021.01)

(58) Field of Classification Search
CPC ..... H04L 63/1416; H04L 63/10; H04L 63/18; H04W 12/1204
See application file for complete search history.

(56) References Cited

U.S. PATENT DOCUMENTS

| 8,793,758 B2 * | 7/2014 | Raleigh ............... H04W 12/088 726/1 |
| 9,384,343 B2 * | 7/2016 | Alessio ................. G06F 3/0236 |
| 2017/0048260 A1 * | 2/2017 | Peddemors ......... H04L 63/0876 |

OTHER PUBLICATIONS

Farrell et al., "System for Application Aware Rate-Limiting Using Plug-In", U.S. Appl. No. 16/105,618, filed Aug. 20, 2018.

* cited by examiner

*Primary Examiner* — Khoi V Le
(74) *Attorney, Agent, or Firm* — Daniel M. Yeates

(57) ABSTRACT

Aspects of the present disclosure relate to techniques for managing transactions, including receiving a first transaction request directed to an account of a first web application. Additionally, initiating, by a rate-limiting engine, a rate-limiting process in response to the first transaction request. The techniques further include obtaining a rate-limiting identifier, where the rate limiting identifier uniquely identifies the first web application, and where the rate-limiting identifier identifies an account owner. The techniques further include determining an alternate notification method exists for the account owner and sending a verification request to the account owner, where the verification request is sent using the alternate notification method. The techniques further include receiving a response to the verification request, performing a risk assessment, and adjusting a first security parameter in response to the risk assessment.

19 Claims, 7 Drawing Sheets

TRANSACTION AUTHENTICATION AND RISK ANALYSIS

BACKGROUND

The present disclosure relates to information security, and, more specifically, to preventing fraudulent transactions.

Applications often customize user experience by utilizing a user signup and login process. This process has the user establish credentials (e.g. user name and password) in order to later access that service using the same identity. This login operation is the first point (and often only point) of protection, unless a second factor of authentication is enabled and configured for the user (e.g. a time-based one-time password). Rate limiting exists as a method of identifying and mitigating multiple request to a web resource which may be malicious or fraudulent.

SUMMARY

Disclosed is a computer-implemented method comprising receiving, from a first client entity, a first transaction request wherein the first transaction request is directed to an account of a first web application. Additionally, initiating, by a rate-limiting engine, a rate-limiting process, in response to the first transaction request. The method also comprises obtaining a rate-limiting identifier, wherein the rate limiting identifier identifies an account owner. The method also comprises determining an alternate notification method exists for the account owner. The method also comprises sending, a verification request to the account owner using the alternate notification method. The method includes receiving a response to the verification request, performing a risk assessment, and adjusting at least a first security parameter in response to the risk assessment.

Also disclosed is a computer-implemented method for preventing fraudulent transactions. The method includes implementing an identity aware rate limiting system on an account, wherein the account is associated with a user. The method also comprises determining one or more transaction requests are potentially fraudulent, wherein the one or more transaction requests are directed to the account. The method also comprises, notifying the user of the one or more potentially fraudulent transaction requests. The method also comprises requesting a response from the user, wherein the response comprises an indication the user is aware of the one or more transaction requests. The method also comprises performing, in response to the response, a risk assessment.

Further aspects of the present disclosure are directed to systems and computer program products containing functionality consistent with the methods described above. The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
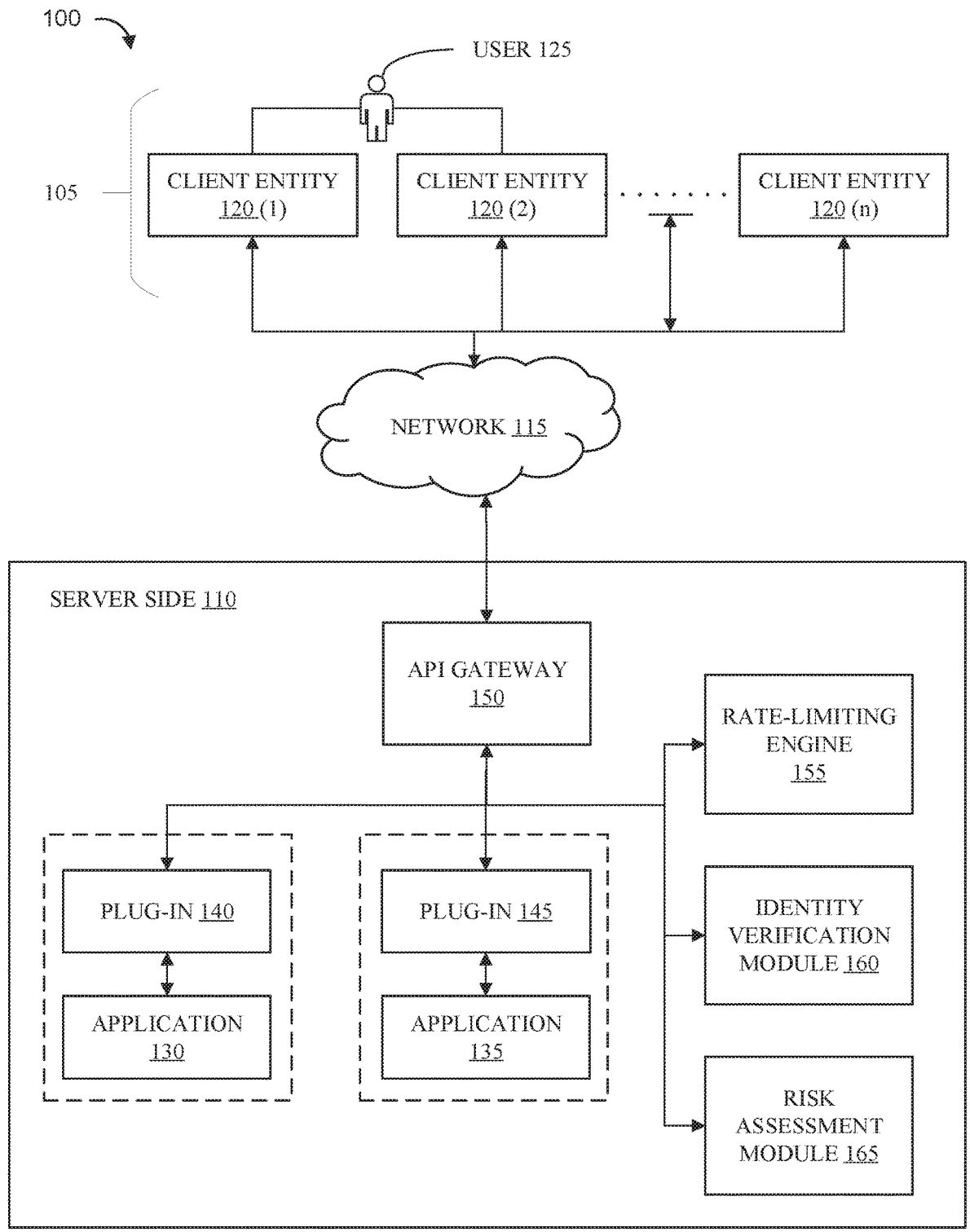
FIG. 1 illustrates a functional diagram of a computing environment suitable for operation of a fraud prevention system in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to computer security, and, more specifically, to preventing fraudulent transactions. Aspects of the present disclosure may be better appreciated in light of the aforementioned applications.

Applications, such as web applications, often customize user experience through a user signup and login process. This process has the user establish credentials (e.g. user name and password) in order to later access that service using the same identity. This process can also include the user providing additional personal (e.g. an alternate email address) and verification information (e.g. answering security questions). This login operation is the first and often only point of protection, unless a second factor of authentication is enabled and configured for the user (e.g. a time-based one-time password). Once logged in, and depending on the application, the user can perform a wide variety of tasks inside their account. These tasks can range from choosing a video to stream to a device, reading and sending emails, transferring money from a saving account, and so on. Applications offer ease and convenience to users but can also have unexpected consequences if a malicious entity gains unauthorized access to an account (e.g. wire money out of a saving account, loss of confidential information, etc.).

Rate limiting exists as a method of identifying and mitigating requests to a web resource which may be malicious or fraudulent. Rate limiting is often a tool employed to protect a web application from denial of service attacks (DOS), distributed denial of service attacks (DDOS), and/or brute force attacks. Rate limiting a login operation, and optionally including a second-factor operation, can decrease the likelihood malicious attacks will be successful.

Rate-limiting is commonly used when accepting requests for a web application employing publicly accessible web application programming interfaces (APIs). This rate-limiting is often one of the first things performed when a web request is made to a web application or service. Conventional rate-limiting is typically performed by a perimeter device like an API gateway or service such as Cloudflare® (a registered trademark of Cloudflare, Inc.). Such perimeter devices are specifically designed for taking a high volume of data traffic and distributing the data across a cluster of application nodes. Additionally, such perimeter devices often include other services which lay at the perimeter of the network (e.g., internet protocol (IP) blacklists, uniform resource locator (URL) mapping from public to internal URLs, transformation services, load balancing).

Existing rate-limiting techniques, in general, are not particularly aware of the web applications by which they are being utilized. While existing techniques may be configured to rate-limit based on a particular piece of request data, such as the incoming IP address or a header, such techniques are not capable of identifying abuse when it occurs at the application level. For example, in a distributed denial-of-service attack (DDoS attack), the incoming traffic flooding the network system originates from many different outside sources having different IP addresses and headers. In some instances, these different sources focus their attack on one or more web applications by concurrently submitting a substantial number of requests for the web application from sources having different IP addresses and/or headers. This effectively makes it difficult or impossible to stop the attack simply by blocking a single source.

Various aspects of the present disclosure include an appreciation that current rate-limiting operations allow abuse of requests to a web application by malicious actors providing requests using multiple, different IP addresses and headers. In order to protect the web application from such threats, certain disclosed embodiments use a plug-in of the web application to generate a rate-limiting key that is unique to the web application. The rate-limiting key may use relevant rate-limiting algorithms to rate-limit requests provided to the web application and thereby assist in protecting and/or mitigating abuse of requests to the web application using relevant rate-limiting algorithms. As such, rate-limiting of requests to the web application occurs at an application level, thereby making the rate-limiting operations application aware. In some embodiments, the rate-limiting key can include data that links the application to a specific user/account. Thus, the rate-limiting can be identity aware as well as application aware.

When a particular account is being attacked via such brute force techniques, the user is generally not aware or notified of the potential breach of their account. This may allow the attacker to continue the attack undetected over a period of time until they give up or are successful.

Embodiments of the present disclosure identify a method by which an account owner can be notified when a transaction associated with the user's account has been subjected to a rate limiting process or the account is otherwise under attack. In some embodiments, an account can be under attack when the application determines a client entity, not associated with the user (e.g. account owner) is attempting to gain access to that account. In some embodiments, an account can be under attack when a rate limiting process is initiated.

Embodiments of the present disclosure can implement a fraud prevention system. In some embodiments, the fraud prevention system can combine application aware rate limiting, identity aware rate limiting, and out of band feed back (e.g. two factor authentication) to prevent fraudulent transactions in a user's personalized account. In some embodiments, the fraud prevention system can perform risk analysis to determine if a security vulnerability exists. In some embodiments, the out of band feedback is sent based on a policy (e.g. fraud protection parameters, etc.). In some embodiments, the fraud prevention system can utilize feedback from a user to adjust the amount/strength of rate limiting, or other security parameters used on the user's account.

The aforementioned advantages are example advantages, and embodiments exist that can contain all, some, or none of the aforementioned advantages while remaining within the spirit and scope of the present disclosure.

FIG. 1 illustrates a simplified block diagram of one embodiment of a system implementing an identity aware fraud prevention system, generally labeled 100, in accordance with some embodiments of the present disclosure In some embodiments, the fraud prevention system 100 includes a client side 105 that communicates with a server side 110 over a network 115. On the client side 105, there is a plurality of client entities 120(1), 120(2) to 120(n), where "n" is an integer index. Client entities 120 submit requests to one or more web applications 130 and 135, on the server side 110 and receive responses to those requests at the client side 105. In some embodiments, user 125 can access applications 130 and 135 via one or more of client entities 120. In some embodiments, user 125 can be a person, an entity, a computing device, a software system attempting to access server side 110 via one or more of client entities 120. In various embodiments, user 125 may be authorized to access the applications 130, 135 on server side 110. In some embodiments, there are one or more additional users (not shown). In some embodiments, the one or more additional users may be attempting to make fraudulent transactions.

Client entities 120 can be a standalone computing device, a management server, a web server, a mobile computing device, or any other electronic device or computing system capable of receiving, sending, and processing data. In other embodiments, client entities 120 can represent a server computing system utilizing multiple computers as a server system, such as in a cloud computing environment. In some embodiments, client entities 120 represent a computing system utilizing clustered computers and components (e.g., database server computers, application server computers, etc.) that act as a single pool of seamless resources when accessed within system 100.

Each web application 130 and 135 is associated with a plug-in 140 and 145, respectively, described in further detail herein. The server side 110 can also include an API gateway 150, a rate-limiting engine 155, an identity verification module 160, and a risk assessment module 165, all of which are described in further detail herein. In certain embodiments, the rate-limiting engine 155, identity verification module 160, and/or risk assessment module 165 may be included in the API gateway 150. It will be recognized that the number and type of web applications are a matter of design choice. In some embodiments, server side 110 can include any number of additional applications, and their corresponding plug-ins (not shown).

Network 115 can be, for example, a telecommunications network, a local area network (LAN), a wide area network (WAN), such as the Internet, or a combination of the three, and can include wired, wireless, or fiber optic connections. Network 115 may include one or more wired and/or wireless networks that are capable of receiving and transmitting data, voice, and/or video signals, including multimedia signals that include voice, data, and video information. In general, network 115 may be any combination of connections and protocols that will support communications between client side 105 and server side 110, more specifically, client entities 120, web applications 130 and 135, other computing devices, and applications and/or modules (not shown) in system 100.

Communications between client entities 120 and servers in a large network such as the Internet involve a number of steps and protocols. Servers may host web applications, such as web applications 130 and 135, that respond to requests made by the client entities 120. In certain examples, communications between client entities 120 and the server side 110 use the Transmission Control Protocol (TCP) for handling transport of requests for the web applications 130 and 135. In certain embodiments, requests transmitted by the client entities 120 are encapsulated in a TCP stack that includes transport identifiers, such as IP addresses and headers. In certain embodiments, the incoming requests provided to the API gateway 150 are encapsulated in one or more such transport layers. In certain embodiments, the API gateway 150 forwards the requests for further processing after removing all of the transport layers. In certain embodiments, the API gateway 150 forwards the requests for further processing after removing less than all of the transport layers.

In certain embodiments, communications with the web applications 130 and 135 take place at the application level. In certain embodiments, communications with the plug-ins 140 and 145 also take place at the application level. In certain embodiments, communications between the rate-limiting engine 155, identity verification module 160, risk assessment module 165, plug-ins 140 and 145, and web applications 130 and 135 also take place at the application level.

In certain embodiments, hypertext transfer protocol (HTTP) may be used for communications at the application level. HTTP is a protocol defining how messages are formatted and transmitted and includes commands for interacting with web applications. HTTP is referred to as a stateless protocol because each command is executed independently, without knowledge of the commands that came before it.

In certain embodiments, requests for one or more of the web applications 130 and 135 are received from the network 115 at API gateway 150. The various functional blocks shown in FIG. 1 communicate with one another over one or more communication channels that are dependent on a potential fraudulent state and/or a rate-limiting state existing at the server side 110. As used herein, a communication channel is any hardware or software establishing a connection for transfer of information between one or more of the functional blocks.

API gateway 150 can be any combination of hardware and/or software configured to receive requests from client entities 120 and then distribute those requests to the appropriate applications. In some embodiments, API gateway 150 can be configured for taking a high volume of data traffic and distributing the data across a cluster of application nodes (e.g. web applications). In some embodiments, API gateway 150 can add or remove the transport layers before proceeding to the next operation.

Rate limiting engine 155 can be any combination of hardware and/or software configured to identify a need for, implement, and/or monitor rate-limiting processes. In some embodiments, rate-limiting engine 155 can create/request a rate-limiting identifier. The rate-limiting identifier uniquely identifies the target account of the request. The rate-limiting identifier can identify web application 130, user 125, a user account, and/or other information that can be used to identify the application and the account being requested. The rate-limiting identifier can be used by the rate-limiting engine 155 to rate-limit requests to the target account of web application 130 at the application level. The rate-limiting identifier is used by the rate-limiting engine 155 as a "key" against which rate-limiting algorithms are applied. In certain embodiments, such rate-limiting algorithms may be based on conventional rate-limiting techniques.

The rate-limiting identifier is selected so that it uniquely identifies web application 130, user 125, and/or a user account, to distinguish web application 130 from other web applications, users, and accounts. In certain embodiments, the use of a unique hash value to uniquely identify the target account allows the rate-limiting engine 155 to apply traditional rate-limiting algorithms against the target account, rather than statically against a piece of data in the request (i.e., the client IP or header). In certain embodiments, the hash value may be generated from data that is not directly present in the web application requests. In certain embodiments, the hash value may be generated using data in a refresh token that is presented as a handle into a database which has a consistent ID. In some embodiments, the rate-limiting identifier allows API gateway 150 to access all data for the user in application 130. This can be a method of finding or verifying an alternate contact method exists for a user or for an account.

Application plug-ins 140 and 145 can be any combination of hardware and/or software configured to be an interface between web application 130 and 135, and API gateway 150. In certain embodiments, the plug-in 140 and/or 145 generates a hash value as the rate-limiting identifier. In certain embodiments, the hash value is not a literal string hashing of the incoming requests, but a hash value produced programmatically by a piece of code that the administrator of the API gateway 150 can choose to implement.

Identity verification module 160 can be any combination of hardware and/or software configured to request a verification and receive a response to the request. In some embodiments, the identity verification module 160 utilizes a two-factor authentication system. In some embodiments, the identity verification module 160 is configured to perform out of band verification. Out of band can be any communication method that is different than an original request. Out of band verification or feedback should be performed such that an entity attempting to perform a fraudulent transaction is unaware of the verification request. For example, if a bad actor is using a computing system to attempt to access a user's bank account, the out of band verification can be calling a traditional telephone. In some embodiments, identity verification module 160 can be configured to accept, search for, and/or store alternate communication methods.

Risk assessment module 165 can be any combination of hardware and/or software configured to assess the risk of fraud for a user account. In some embodiments, risk assessment module 165 activates in response to a rate-limiting event. In some embodiments, risk assessment module 165 activates in response to an out of band feedback request. In some embodiments, the results of the risk assessment are stored in a risk assessment repository. In some embodiments, the results of prior assessments can be used in a later assessment.

Figure 2:
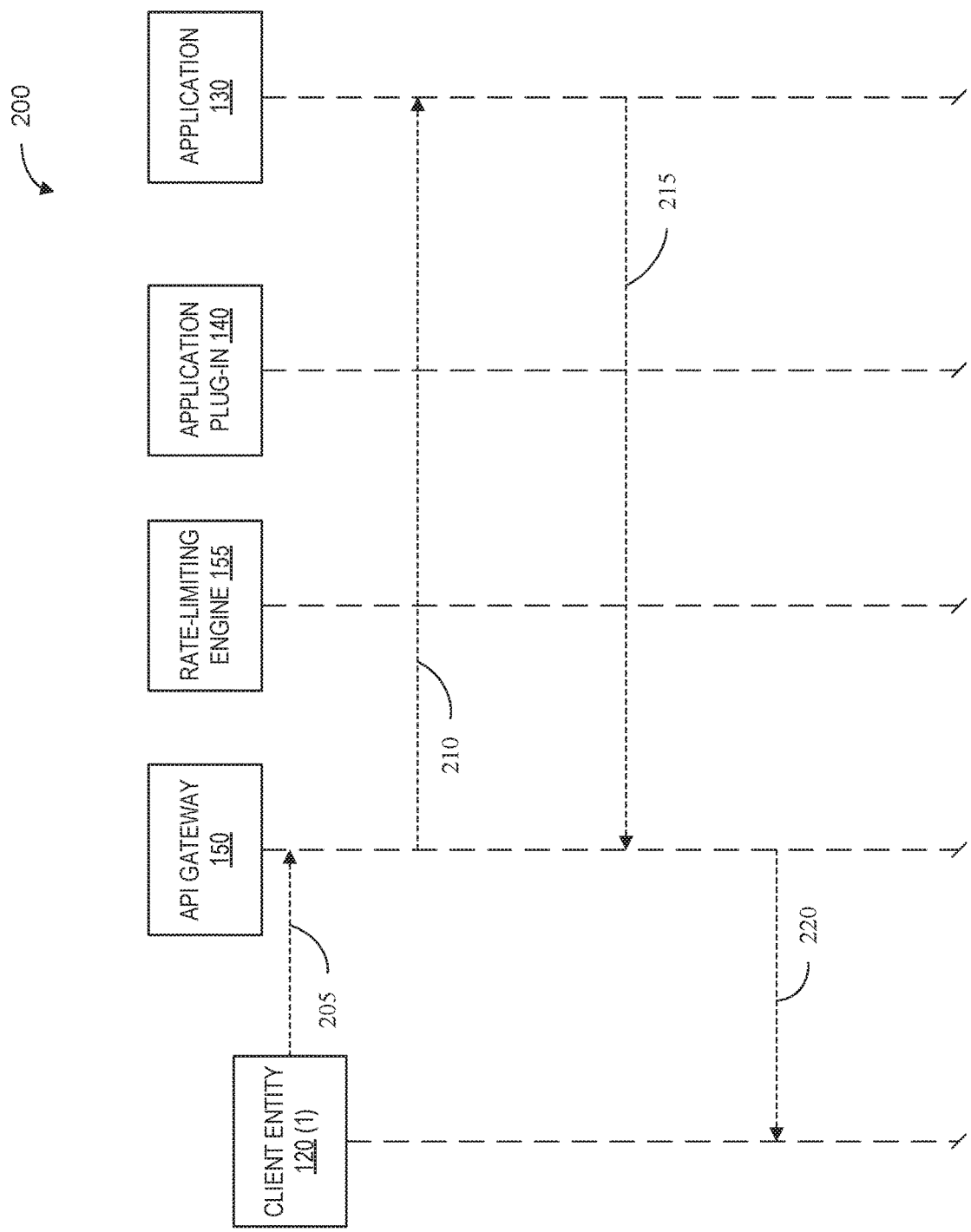
FIG. 2 illustrates a flow diagram of one manner in which various function blocks communicate after a request to a web application in accordance with some embodiments of the present disclosure.

FIG. 2 is a flow diagram, generally labeled 200, depicting one manner in which the various functional blocks communicate when the requests for a web application without implementing the fraud prevention system. FIG. 2 can include more or fewer operations than those operations that are depicted. FIG. 2 can include operations in different orders than those orders depicted. Likewise, FIG. 2 can include operations that occur simultaneously rather than sequentially. Many modifications to the depicted method may be made by those skilled in the art without departing from the spirit and scope of the present disclosure. For simplicity, the operations are described with respect to client entity 120(1) and client entity 120(2), web application 130, and plug-in 140. However, in various embodiments, client entity 120(1) can represent one or more of client entities 120 simultaneously. Also, it will be appreciated that similar operations may be executed with respect to any web applications hosted at the server side 110.

At operation 205, client entity 120(1) can submit a request for application 130. In some embodiments, the request can be directed to API gateway 150. In some embodiments, the requests are encapsulated within one or more transport layers. In these embodiments, API gateway 150 can remove the transport layers before proceeding to the next operation. At operation 210, API gateway 150 forwards the request to application 130. In some embodiments, fraud prevention system can bypass rate-limiting engine 155 and application plug-in 140. In some embodiments, the API gateway 150 removes all of the transport layers and forwards requests received from the network 115 directly to the destination web application 130 at the application level. At operation 215, application 130 sends the response (or processed request) to API gateway 150. At operation 220, API gateway 150 provides the response to client entity 120(1). In certain embodiments, the API gateway 150 encapsulates the responses within one or more transport layers prior to providing the responses to the requesting entities. It will be recognized that intermediate layers of network functionality may exist to facilitate communications between the API gateway 150 and the client entity 120(1).

Figure 3:
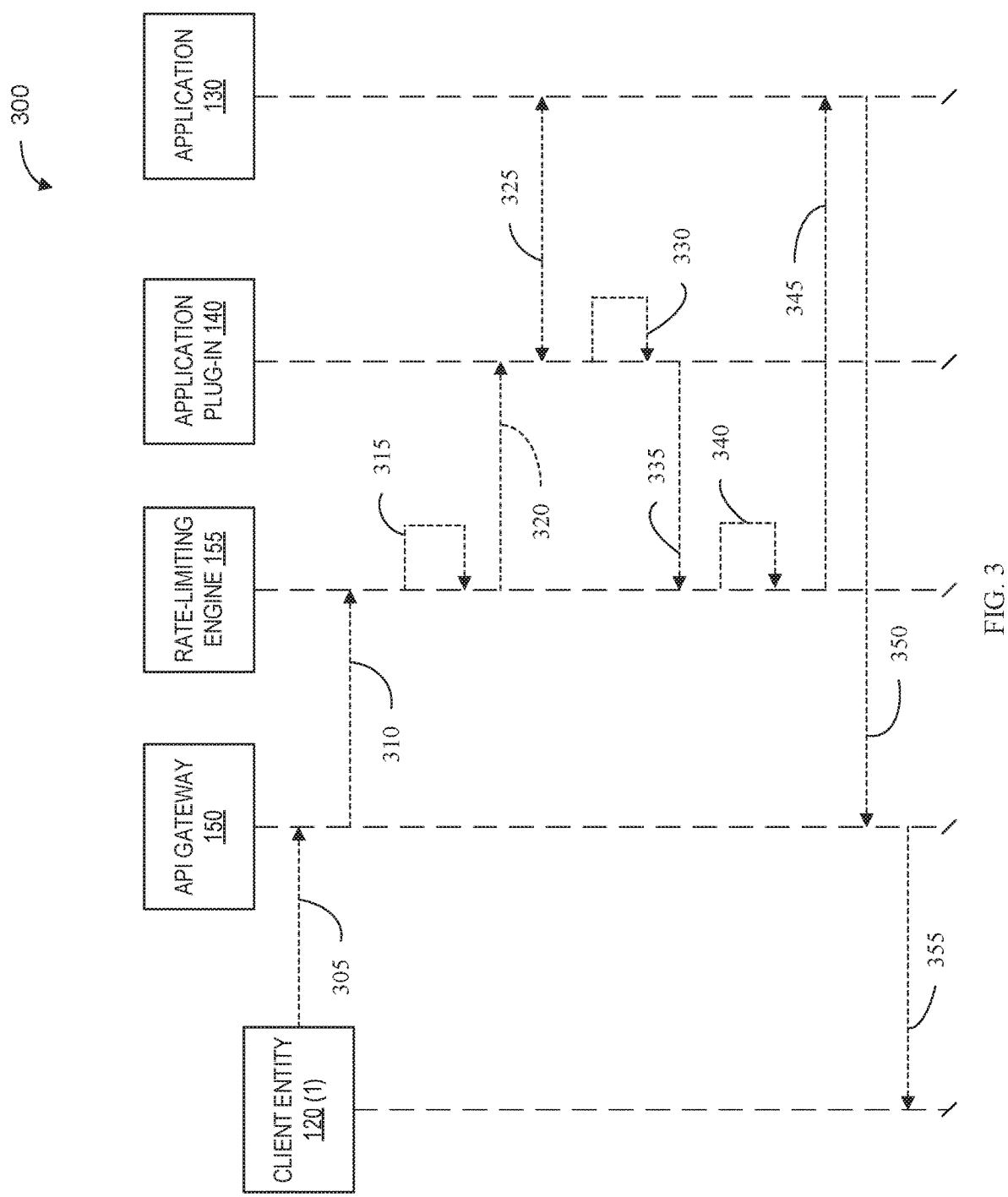
FIG. 3 illustrates a flow diagram of one manner in which various function blocks communicate after a request implementing identity aware rate-limiting in accordance with some embodiments of the present disclosure.

FIG. 3 is a flow diagram, generally labeled 300 depicting one manner in which the various functional blocks communicate with the rate limiting portion of the fraud prevention system. FIG. 3 can include more or fewer operations than those operations that are depicted. FIG. 3 can include operations in different orders than those orders depicted. Likewise, FIG. 3 can include operations that occur simultaneously rather than sequentially. Many modifications to the depicted method may be made by those skilled in the art without departing from the spirit and scope of the present disclosure. For simplicity, the operations are described with respect to client entity 120(1) and client entity 120(2), web application 130, and plug-in 140. However, in various embodiments, client entity 120(1) can represent one or more of client entities 120 simultaneously. Also, it will be appreciated that similar operations may be executed with respect to any web applications hosted at the server side 110.

At operation 305, client entity 120(1) can submit a request for application 130, that is directed to API gateway 150. In some embodiments, operation 305 can be consistent with operation 205 of FIG. 2. At operation 310, API gateway 150 sends the request to rate limiting engine 155. In some embodiments, API gateway 150 determines if the request should be rate limited. In these embodiments, API gateway 150 sends a command to initiate rate limiting with the request. At operation 315, rate limiting engine 155 determines whether the request should be rate limited. In some embodiments, rate limiting engine 155 can determine application aware and/or identity aware rate limiting should be initiated.

At operation 320, rate limiting engine 155 calls application plug-in 140. In some embodiments, the call to application plug-in 140 can include an instruction to obtain a rate-limiting identifier from the application plug-in 140. At operation 325, application plug-in 140 can obtain contextual information from application 130. In some embodiments, the contextual information can include user identity data, user account data, and other information provided by web application 130. In some embodiments, the user identity is determined by use of a cookie. A cookie is a small piece of data that contains information about an account, or actions taken from a computing device. The contextual information can include any data provided by a user 125 to web application 130 at any previous time. In some embodiments, the contextual information can include an alternate method of communication. Such context information may include initialization data or other fixed value data used by the web application 130. In certain embodiments, the initialization data may include configuration files in various configuration formats, such as text or extensible markup language ("XML").

At operation 330, application plug-in 140 can generate a rate-limiting identifier. The rate-limiting identifier uniquely identifies the target account of the request. The rate-limiting identifier can identify web application 130, user 125, a user account, and/or other information that can be used to identify the application and the account that is the target of the request. The rate-limiting identifier can be used by the rate-limiting engine 155 to rate-limit requests to the target account of web application 130 at the application level. The rate-limiting identifier is used by the rate-limiting engine 155 as a "key" against which rate-limiting algorithms are applied. In certain embodiments, such rate-limiting algorithms may be based on conventional rate-limiting techniques.

The rate-limiting identifier is selected so that it uniquely identifies web application 130, user 125, and/or a user account, to distinguish web application 130 from other web applications, users and accounts. In certain embodiments, the plug-in 140 generates a hash value as the rate-limiting identifier. In certain embodiments, the hash value is not a literal string hashing of the incoming requests, but a hash value produced programmatically by a piece of code that the administrator of the API gateway 150 can choose to implement. In certain embodiments, the use of a unique hash value to uniquely identify the target account allows the rate-limiting engine 155 to apply rate-limiting algorithms against the target account, rather than statically against a piece of data in the request (i.e., the client IP or header).

At operation 335, application plug-in 140 returns the rate limiting identifier to rate-limiting engine 155. At operation 340, the rate-limiting engine 155 uses the rate-limiting identifier for web application 130 to rate-limit requests sent to the web application 130. At operation 345, rate-limiting engine 155 sends a request to web application 130 at the rate limited rate. In certain embodiments, the rate-limiting engine 155 caches requests for web application 130 during the rate-limiting set up and provides the cached requests to the web application 130 at the rate-limit. At operation 350, web application 130 provides responses to the requests to the API gateway 150. At operation 355, API gateway 150 provides the processed request to client entity 120(1).

In certain embodiments, the rate-limiting engine 155 exposes an interface for communication with the application plug-in 140 using a traditional library, an open service gateway initiate (OSGI) plug-in interface, or uploaded Java® (a registered trademark of Oracle America, Inc.) script snippet. In certain embodiments, a contract is established between the rate-limiting engine 155 and application plug-in 140. In certain embodiments, the application plug-ins are implemented as Java script code.

Figure 4:
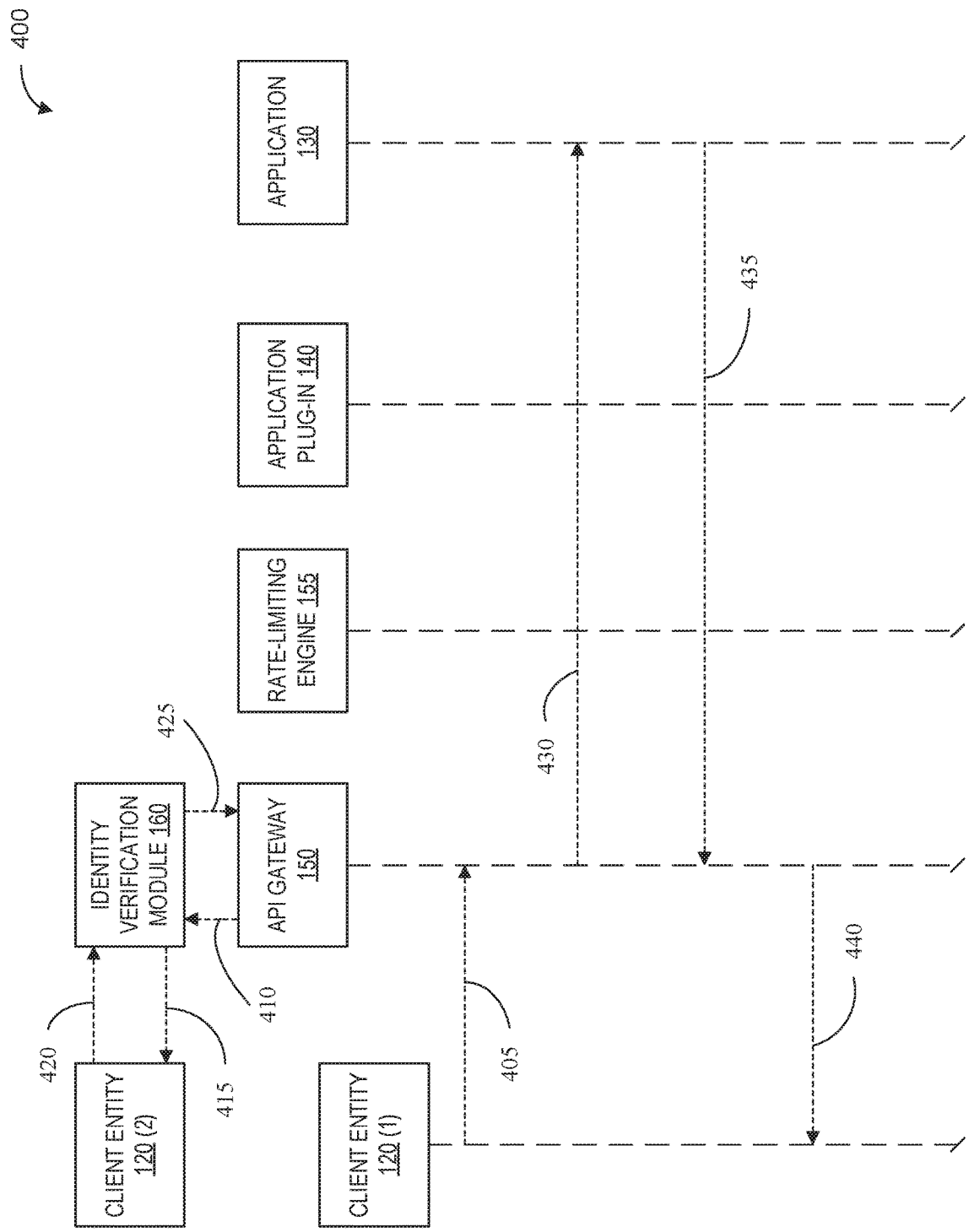
FIG. 4 illustrates a flow diagram of one manner in which various function blocks communicate after a request implementing out of band feedback in accordance with some embodiments of the present disclosure.

FIG. 4 is a flow diagram, generally labeled 400 depicting one manner in which the various functional blocks communicate during an out of band verification by the fraud prevention system. FIG. 4 can include more or fewer operations than those operations that are depicted. FIG. 4 can include operations in different orders than those orders depicted. Likewise, FIG. 4 can include operations that occur simultaneously rather than sequentially. Many modifications to the depicted method may be made by those skilled in the art without departing from the spirit and scope of the present disclosure. For simplicity, the operations are described with respect to client entity 120(1) and client entity 120(2), web application 130, and plug-in 140. However, in various embodiments, client entity 120(1) can represent one or more client entities 120 simultaneously. Also, it will be appreciated that similar operations may be executed with respect to any web applications hosted at the server side 110.

At operation 405, client entity 120(1) can submit a request for application 130 that is directed to API gateway 150. In some embodiments, operation 405 can be consistent with operation 205 of FIG. 2.

At operation 410 API gateway 150 initiates out of band verification. In some embodiments, out of band verification is initiated in response to an event. The event can be an abnormal request (e.g. login from new IP address, or new device), random selection, after a trigger (e.g. period of time, number of requests, etc.), or other similar events. In some embodiments, the out of band verification can be initiated after any or all transaction requests. Out of band verification can include notifying identity verification module 160 that out of band verification has been initiated. In various embodiments, operation 410 can be initiated by rate-limiting engine 155, application plug-in 140 and/or application 130.

At operation 415, identity verification module 160 requests verification from client entity 120(2). In some embodiments the request for verification can be sent to client entity 120(1). In various embodiments, the verification request can be configured to determine if the user initiated, and/or authorized the transaction request. For example, an agent of the user can provide verification that the transaction request is on behalf of and by the authority of the account owner. In these embodiments, the verification can come through a different web application or service that is designed to provide additional verification (e.g. two-factor authentication).

At operation 420, client entity 120(2) sends the response to identity verification module 160. In some embodiments, the response is generated by client entity 120(2) based on an input from user 125. At operation 425, identity verification module 160 analyses the response and returns the results to API gateway 150. In various embodiments, the response can be positive (e.g. verification is successful), negative (e.g. user indicates a fraudulent request was sent), no response (user did not respond), and/or inconclusive (e.g. appears positive but there is evidence bad actor has access to out of band verification method).

At operation 430, API gateway 150 forwards the request to application 130. In some embodiments, operation 430 can be consistent with operation 210 of FIG. 2. At operation 435, web application 130 sends a response (or processed request) for the request to API gateway 150. In various embodiments, the response is based on the outcome of the out of band verification (e.g. positive verification leads to an expected response, or negative verification denies the request). At operation 440, API gateway 150 provides the response to client entity 120(1). In some embodiments, operation 440 can be consistent with operation 220 of FIG. 2.

In various embodiments of FIG. 4, the out of band verification can be initiated by API gateway 150, rate-limiting engine 155, and/or application plug-in 140. In these embodiments, the response is returned to the module that initiated the verification, and the request is then forwarded to web application 130.

Figure 5:
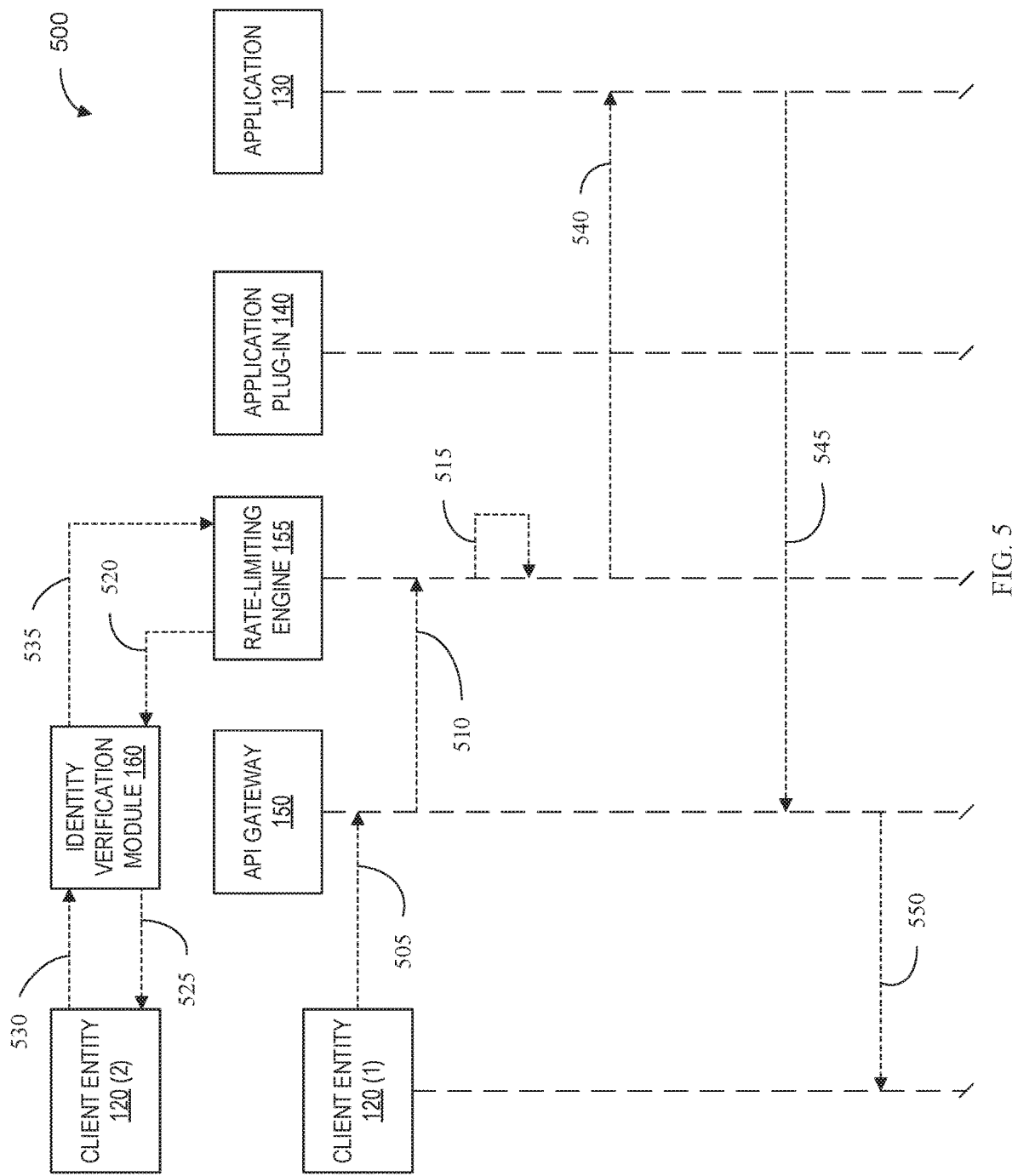
FIG. 5 illustrates a flow diagram of one manner in which various function blocks communicate after a request implementing identity aware rate-limiting and out of band feedback in accordance with some embodiments of the present disclosure.

FIG. 5 is a flow diagram, generally labeled 500 depicting one manner in which the various functional blocks communicate when the fraud prevention system combines identity aware rate limiting and out of band feedback. FIG. 5 can include more or fewer operations than those operations that are depicted. FIG. 5 can include operations in different orders than those orders depicted. Likewise, FIG. 5 can include operations that occur simultaneously rather than sequentially. Many modifications to the depicted method may be made by those skilled in the art without departing from the spirit and scope of the present disclosure. For simplicity, the operations are described with respect to client entity 120(1) and client entity 120(2), web application 130, and plug-in 140. However, in various embodiments, client entity 120(1) can represent one or more of one or more client entities 120 simultaneously. Also, it will be appreciated that similar operations may be executed with respect to any web applications hosted at the server side 110.

At operation 505, client entity 120(1) can submit request for application 130, that is directed to API gateway 150. In some embodiments, operation 505 can be consistent with operation 205 of FIG. 2. At operation 510, API gateway 150 sends the request to rate limiting engine 155. In some embodiments, operation 510 can be consistent with operation 310 of FIG. 3. At operation 515, rate-limiting engine 155 initiates identity aware rate-limiting. In some embodiments, operation 515 can include obtaining and implementing the rate-limiting identifier, consistent with operations 315-340 of FIG. 3.

At operation 520, rate-limiting engine 155 can initiate out of band verification. In some embodiments, out of band verification is consistent with the out of band verification discussed in FIG. 4 (operations 410-430). In some embodiments, operation 520 includes activating identity verification module 160. At operation 525 identity verification module 160 sends a verification request to client entity 120(2). In some embodiments, the verification request is sent to user 125 via client entity 120(2). In various embodiments, the verification request is sent out of band from the original request made to web application 130. At operation 530, identity verification module 160 receives a response from client entity 120(2). In some embodiments, the response is from user 125 via client entity 120(2). In some embodiments, operation 530 can be consistent with operation 425 of FIG. 4.

At operation 535 rate-limiting engine receives the results of the out of band verification. In some embodiments, operation 535 can include an assessment by risk assessment module 165 (not shown in FIG. 5). In some embodiments, operation 535 can be consistent with operation 425-435 of FIG. 4. At operation 540, rate-limiting engine 155 forwards the request to the application 130. In some embodiments, the request is sent after rate limiting and a positive verification of identity. In some embodiments, operation 540 can be consistent with operation 345 of FIG. 3. At operation 545, web application 130 responds to the request. In some embodiments, operation 535 can be consistent with operation 350 of FIG. 3. At operation 550, API gateway 150 provides the processed request to client entity 120(1).

Figure 6:
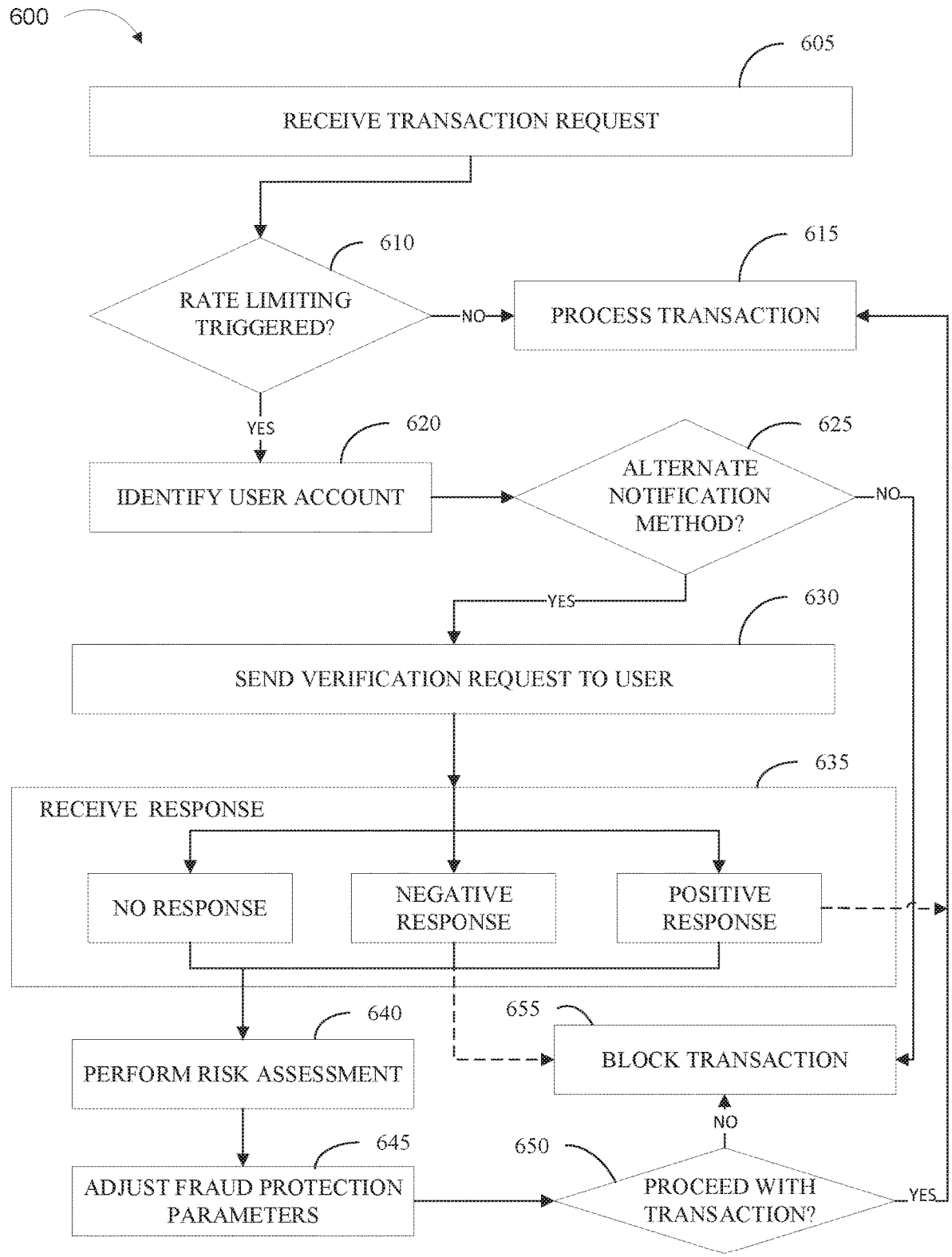
FIG. 6 illustrates a flow chart of a method performed by a fraud prevention system in accordance with some embodiments of the present disclosure.

FIG. 6 is a flow diagram, generally labeled 600 depicting a method used by some embodiments of the fraud prevention system. FIG. 6 can include more or fewer operations than those operations that are depicted. FIG. 6 can include operations in different orders than those orders depicted. Likewise, FIG. 6 can include operations that occur simultaneously rather than sequentially. Many modifications to the depicted method may be made by those skilled in the art without departing from the spirit and scope of the present disclosure.

At operation 605, a fraud prevention system receives a transaction request. In some embodiments, the transaction request can be attempting access to an account (e.g. login) or an action within an account (e.g. transfer money). At operation 610, the fraud prevention system determines if rate-limiting is triggered. In some embodiments, rate limiting engine 155 determines if rate limiting was triggered. If it is determined rate limiting is not triggered (decision tree "NO" branch), then operation 615 is performed. At operation 615, the transaction is processed through web application 130. In some embodiments, operation 615 can be consistent with the operations of FIG. 2. If it is determined rate limiting has been triggered (decision tree "YES" branch), then operation 620 is performed. At operation 620, the fraud prevention system identifies the user account. In some embodiments, identifying the user account can include identifying the user. In some embodiments, the user account is identified by identity aware rate limiting (e.g. operations 315 to 340 of FIG. 3).

At operation 625, the fraud prevention system determines if an alternate notification method is available. In some embodiments, the alternate notification method can be out of band feedback. In some embodiments, the alternate notification can be performed by identity verification module 160. Alternate can mean any method, system, or network that is outside of the source of the request (e.g., request through internet, alternate notification through telephone network, etc.). In some embodiments, the alternate notification is any method of communication with user 125, or the account owner such that, if a bad actor is attempting fraud, the bad actor is likely unaware of the alternate notification. If there is not an alternate notification method (decision tree "NO" branch) then the system performs operation 655, discussed in further detail below. In various embodiments, any other operation (e.g. operation 615 process transaction) can be performed. If there is an alternate notification method (decision tree "YES" branch) then the system proceeds to operation 630.

At operation 630, the fraud prevention system sends a verification request to the user. The verification request can be any method of communication configured to determine if the request to web application 130 was made with the user's knowledge. In some embodiments, the verification request is sent out of band. In some embodiments, the verification request is generated by identity verification module 160. In some embodiments, the verification request can be consistent with any or all of operations 510-535 of FIG. 5. At operation 635, the fraud prevention system receives the response to the verification request. In some embodiments, the response is received by identity verification module 160. In some embodiments, receiving the response can be consistent with one of more of operations 515-540 of FIG. 5.

Generally, there are three types of a response: a positive response, a negative response, and no response, as previously described. In some embodiments, the system proceeds to operation 640 in response to receiving the response. If the response is no response, the system can proceed to the next operation based on a predetermined criterion. The criteria can be a time limit, (e.g. 10 minutes) or another triggering event.

In some embodiments, if the received response is a positive response, then the system can proceed directly to operation 615 and process the transaction as previously described. In these embodiments, the additional operations (e.g. 640 and 645) may be performed. In some embodiments, if the received response is a negative response then the system proceeds to operation 655 and blocks the transaction, described in more detail below. In these embodiments, the additional operations (e.g. 640 and 645) may be performed.

At operation 640, the fraud prevention system performs a risk assessment. In some embodiments, the risk assessment is based on, in part, the response received at operation 635. In some embodiments, the risk assessment is performed by risk assessment module 165. In some embodiments, the risk assessment can begin immediately after the identity verification request is sent to the user (operation 630). In some embodiments, the risk assessment can be altered after the response is received. In some embodiments, the risk assessment system can perform the risk analysis assuming a default response until the actual response is received (e.g. perform risk assessment as if fraud is indicated until user notifies otherwise). In some embodiments, the risk assessment can include analyzing the validity of the response (e.g. determining if a positive response is fraudulent). In some embodiments, the risk assessment can be based on past events of user 125. For example, one user forgets a password frequently will be analyzed differently than if the user rarely forgets passwords. In some embodiments, the risk assessment can include retrieving results of prior assessments as a factor in the current assessment. In some embodiments, the results of the risk assessment can be stored and later retrieved.

At operation 645, the fraud prevention system adjusts fraud protection parameters. In some embodiments, the adjustments are based on the results of the risk assessment. In some embodiments, the adjustment can include changing the frequency or intensity of rate-limiting, locking an account, cancelling previous transactions, and/or other similar protective actions.

At operation 650 the fraud prevention system determines if the transaction should be processed. In some embodiments, the determination is made based on the response received in operation 635. In some embodiments, the determination is made based on the results of the risk assessment. In some embodiments, the determination is made based on the fraud protection parameters. In some embodiment the determination is made based on prior input from the account owner. For example, the account may have security options that are chosen by the user. One could be never process unless a positive response is received. One could be based on a threshold, (e.g. if the probability of fraud is greater than 50%), where the threshold is tunable by the user.

If it is determined the transaction should be processed (decision tree "YES" branch), then operation 615 is performed as previously described. If it is determined the transaction should not be processed (decision tree "NO" branch), then operation 655 is performed.

At operation 655, the fraud prevention system blocks the transaction request. In some embodiments, the request is blocked by allowing it to error out (e.g. timeout). In some embodiments, the transaction is blocked by rate-limiting engine 155. In some embodiments, the transaction is blocked by API gateway 150. In some embodiments, the request is blocked by not forwarding the request to application 130.

Figure 7:
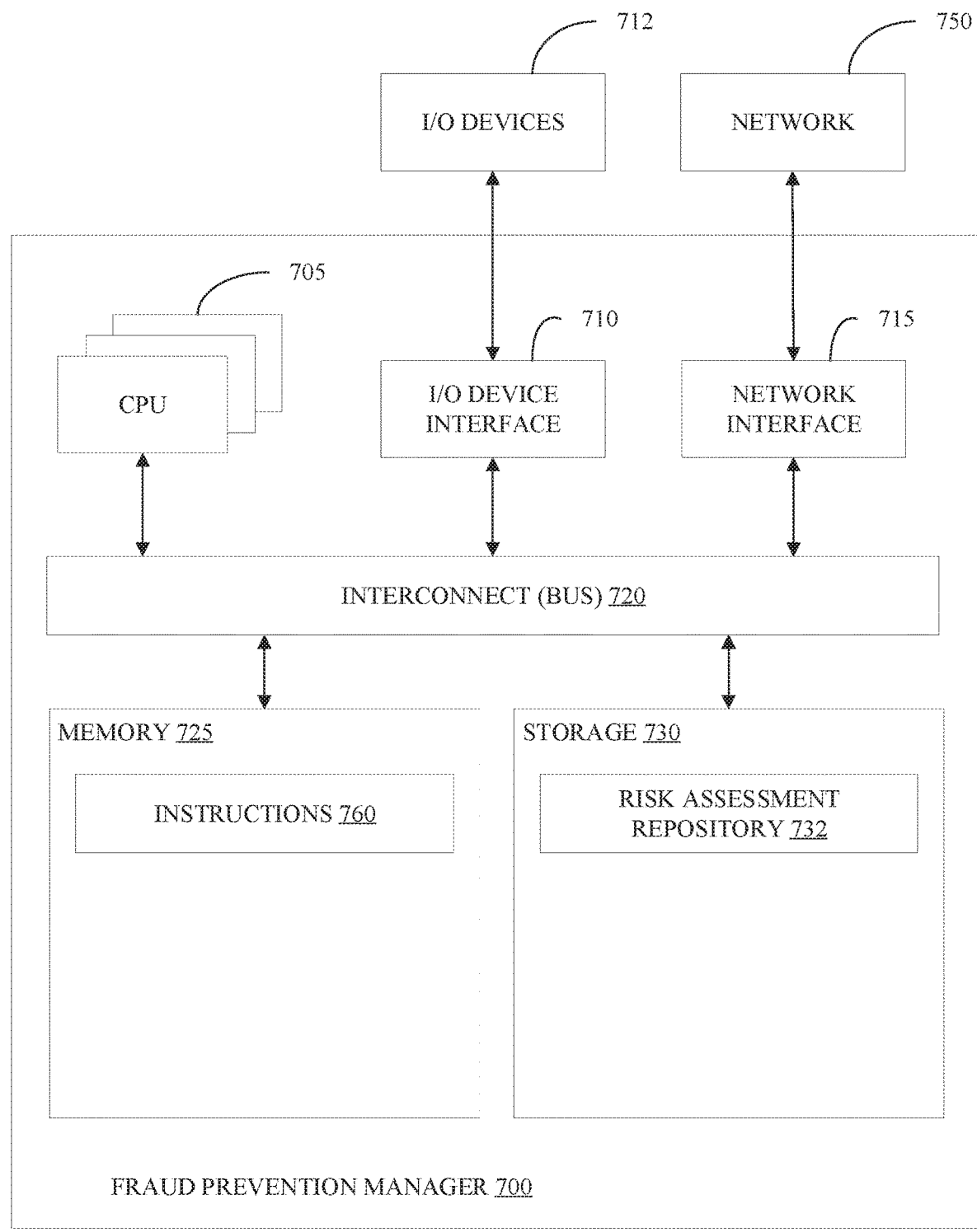
FIG. 7 illustrates a block diagram of an example fraud prevention manager in accordance with some embodiments of the present disclosure.

FIG. 7 illustrates a simplified block diagram of one embodiments of a system implementing fraud prevention manager 700 in accordance with some embodiments of the present disclosure. In some embodiments fraud prevention manager 700 can perform the methods 200-600 as described in FIGS. 2-6. In some embodiments, fraud prevention manager 700 provides instructions for any of the method 200-600 of FIGS. 2-6 to a client machine such that the client machine executes the method, or a portion of the method, based on the instructions provided by the fraud prevention manager 700.

The fraud prevention manager 700 includes a memory 725, storage 730, an interconnect (e.g., BUS) 720, one or more CPUs 705 (also referred to as processors 705 herein), an I/O device interface 710, I/O devices 712, and a network interface 715.

Each CPU 705 retrieves and executes programming instructions stored in the memory 725 or storage 730. The interconnect 720 is used to move data, such as programming instruction, between the CPUs 705, I/O device interface 710, storage 730, network interface 715, and memory 725. The interconnect 720 can be implemented using one or more busses. The CPUs 705 can be a single CPU, multiple CPUs, or a single CPU having multiple processing cores in some embodiments. In some embodiments, a CPU 705 can be a digital signal processor (DSP). In some embodiments, CPU 705 can be a digital signal processor (DSP). In some embodiments, CPU 705 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 725 is generally included to be representative of a nonvolatile memory, such as a hard disk drive, solid state device (SSD), removable memory cards, optical storage, or flash memory devices. In an alternative embodiment, the storage 730 can be replaced by storage area-network (SAN) deices, the cloud, or other devices connected to the fraud prevention manager 700 via the I/O device interface 710 or a network 750 via the network interface 715.

In some embodiments, the memory 725 stores instruction 760 and the storage 730 stores risk assessment repository 732. However, in some embodiments, the instructions 760, and risk assessment repository 732 are partially in memory 725 and partially in storage 730, or they are stored entirely in memory 725 or entirely in storage 730, or they are accessed over a network 750 via the network interface 715.

Instructions 760 can be processor-executable instructions for performing any portion of, or all of, any of the methods 200-600 of FIGS. 2-6.

Risk assessment repository 732 can be a location to store the results of risk assessments. Each assessment can include information relating to the initiation of the assessment, any responses provided by the user, and subsequent actions by the user (e.g. changing password).

In some embodiments, the I/O devices 712 include an interface capable of presenting information and receiving input. For example, I/O device 712 can present information to a user interacting with fraud prevention manager 700 and receive input from the user.

Fraud prevention manger 700 is connected to the network 750 via the network interface 715. Network 750 can comprise a physical, wireless, cellular, or different network.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instruction can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instruction can also be stored in a computer readable storage medium that can direct a computer, a programmable data processing apparatus, and/or other devices to function in a particular manner, such that the computer readable storage medium having instructions stored therein comprises an article of manufacture including instructions which implement aspect of the function/act specified in the flowchart and/or block diagram block or blocks.

The computer readable program instruction can also be loaded onto a computer, other programmable data processing apparatus, or other device to cause a series of operations steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams can represent a module, segment, or subset of instructions, which comprises one or more executable instructions for implementing the specified logical function (s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 760 of FIG. 7 and/or any software configured to perform any subset of the methods described with respect to FIGS. 2-6) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

What is claimed is:

1. A computer-implemented method comprising:
   receiving, from a first client entity, a first transaction request, wherein the first transaction request is directed to a target account of a first web application;
   obtaining, by a rate-limiting engine, a rate-limiting identifier, wherein the rate-limiting identifier identifies the target account and an account owner associated with the target account;
   initiating, by the rate-limiting engine, a rate-limiting process in response to the first transaction request being directed to the target account;
   determining an alternate notification method exists for the account owner;
   sending a verification request to the account owner, wherein the verification request is sent using the alternate notification method;
   receiving a response to the verification request;
   performing a risk assessment, wherein the risk assessment is based on the response and a set of previous risk assessments performed on the account; and
   adjusting, based on feedback from the account owner, a first security parameter in response to the risk assessment, wherein the first security parameter is an amount of rate limiting.

2. The computer-implemented method of claim 1, wherein the verification request is sent out of band from the first transaction request.

3. The computer-implemented method of claim 2, wherein the verification request is sent to a second client entity.

4. The computer-implemented method of claim 1, wherein the first transaction request is a rate-limiting event.

5. The computer-implemented method of claim 1, further comprising:
receiving, from a third client entity, a second transaction request.

6. The computer-implemented method of claim 1, wherein the account owner is a user, and wherein the first transaction request is fraudulent.

7. The computer-implemented method of claim 1, wherein the response to the verification request is selected from the group consisting of: a positive verification, a negative verification, and no response.

8. The computer-implemented method of claim 7, wherein the risk assessment is based on the response to the verification request.

9. The computer-implemented method of claim 1, wherein the adjusting the first security parameter comprises locking the account.

10. The computer-implemented method of claim 1, wherein the adjusting the first security parameter comprises adjusting the rate-limiting process.

11. A system comprising:
a processor; and
a computer-readable storage medium communicatively coupled to the processor and storing program instructions which, when executed by the processor, are configured to cause the processor to perform a method comprising:
receiving, from a first client entity, a first transaction request, wherein the first transaction request is directed to a target account of a first web application;
obtaining, by a rate-limiting engine, a rate-limiting identifier, wherein the rate-limiting identifier identifies the target account and an account owner associated with the target account;
initiating, by the rate-limiting engine, a rate-limiting process in response to the first transaction request being directed to the target account;
determining an alternate notification method exists for the account owner;
sending a verification request to the account owner, wherein the verification request is sent using the alternate notification method;
receiving a response to the verification request;
performing a risk assessment, wherein the risk assessment is based on the response and a set of previous risk assessments performed on the account; and
adjusting, based on feedback from the account owner, a first security parameter in response to the risk assessment, wherein the first security parameter is an amount of rate limiting.

12. The system of claim 11, wherein the verification request is sent out of band from the first transaction request.

13. The system of claim 12, wherein the verification request is sent to a second client entity.

14. The system of claim 11, wherein the first transaction request is a rate-limiting event.

15. The system of claim 11, wherein the program instructions are further configured to cause the processor to perform operations further comprising:
receiving, from a third client entity, a second transaction request.

16. A computer-implemented method for preventing fraudulent transactions, the method comprising:
implementing an identity aware rate limiting system on an account, wherein the account is associated with a user;
determining, by a rate-limiting engine, a transaction request is potentially fraudulent, wherein the transaction request is directed to the account;
identifying, based on a rate-limiting identifier obtained from the identity aware rate limiting system, the user;
notifying the user of the potentially fraudulent transaction request;
requesting a response from the user, wherein the response comprises an indication that the user is aware of the transaction request;
performing, in response to the response, a risk assessment, wherein the risk assessment is based on the response and a set of previous risk assessments performed on the account; and
adjusting, based on the response, a first security parameter in response to the risk assessment, wherein the first security parameter is an amount of rate limiting.

17. The computer-implemented method of claim 16, wherein the notifying and the request are sent out of band from the transaction request.

18. The computer-implemented method of claim 16, wherein the response indicates that the user is aware of the transaction request, the method further comprising:
processing the transaction request.

19. The computer-implemented method of claim 16, wherein the response indicates that the user is not aware of the transaction request, the method further comprising:
blocking the transaction request.

* * * * *